A. STUCKI.
ROLLER SIDE BEARING.
APPLICATION FILED MAR. 4, 1911.
1,096,472.
Patented May 12, 1914.
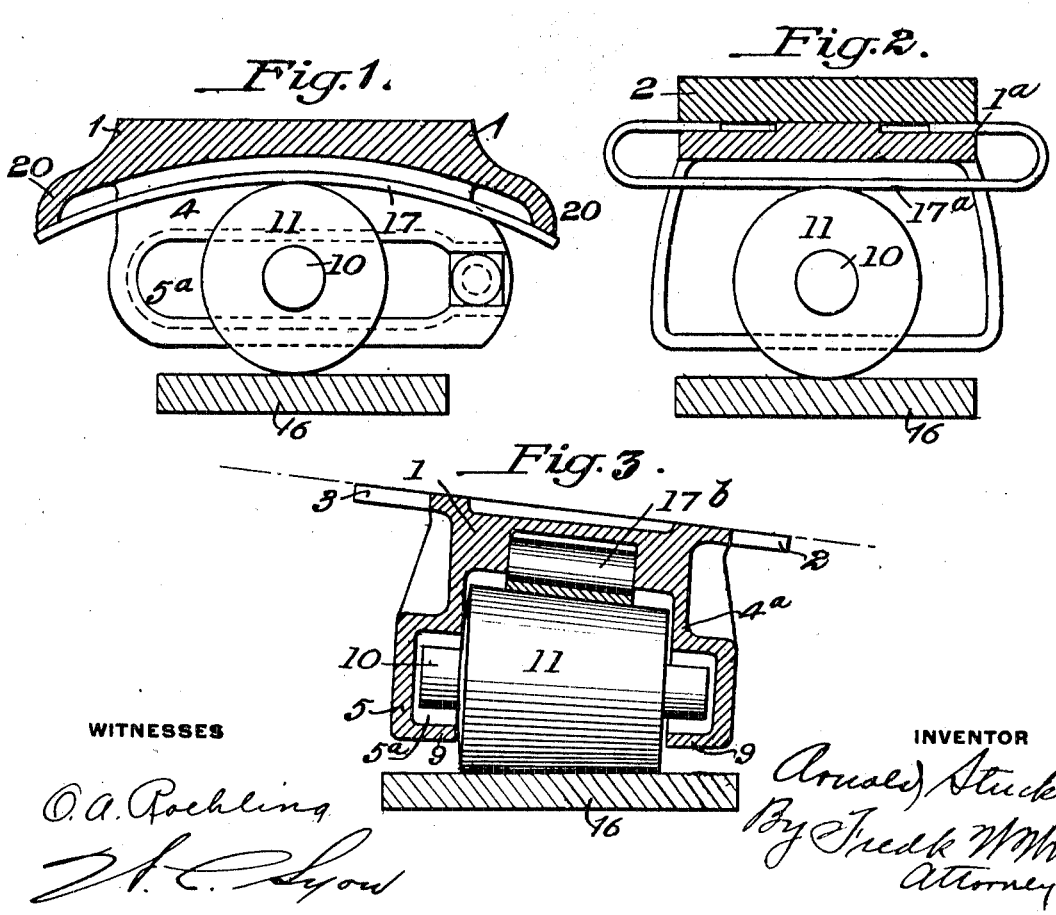

UNITED STATES PATENT OFFICE.

ARNOLD STUCKI, OF PITTSBURGH, PENNSYLVANIA.

ROLLER SIDE BEARING.

1,096,472.  Specification of Letters Patent.  Patented May 12, 1914.

Application filed March 4, 1911. Serial No. 612,350.

*To all whom it may concern:*

Be it known that I, ARNOLD STUCKI, a resident of Pittsburgh, in the county of Allegheny and State of Pennsylvania, have invented a new and useful Improvement in Roller Side Bearings, of which the following is a specification.

This invention relates to side bearings for railway cars.

The object is to provide a side bearing which is frictionless and which nevertheless performs all of the other necessary functions of side bearings, which is inexpensive both as to first cost and subsequent repair and particularly one so arranged that the rollers or anti-friction elements are so controlled that said roller will always be in proper position to take the load of the car and to travel with all changes of angular relation of the bolsters, and which controlling means is so arranged that the roller or other anti-friction element cannot be displaced even by severe end shocks or jolts on the car.

Roller or other anti-friction side bearings for cars are of considerable value in reducing friction, but in order to perform this function it is necessary that the rollers travel along the bearing surfaces with all changes in the angular relation of the bolsters and irrespective of whether the bolsters are closed normal or apart vertically. If the roller does not do this it will happen that the bolsters or bearings will come together with the roller in such position that on change in angular relation of the bolster the roller cannot roll, that is, it will be against one end or the other of the bearing housing, in which case it must slide and would really be worse than a solid bearing.

I have heretofore proposed an arrangement for causing the roller to travel with all changes in the angular relations of the bolsters and irrespective of whether the bolsters' bearings are partly separated or are tightly contacting.

The present improvement has for its purpose the same object, with the addition that the parts are so arranged that the roller cannot become displaced or moved to one end or the other of the housing under severe endwise shocks or jolts on the car.

The invention comprises the construction and arrangement of parts hereinafter described and claimed.

In the accompanying drawings Figure 1 is a vertical sectional view, taken transverse to the axis of the roller, through a side bearing embodying the invention; Fig. 2 is a similar view, showing a modified form of spring plate; and Fig. 3 is a vertical sectional view, taken longitudinally of the axis of the roller, and corresponding to Fig. 1 except that a slightly modified form of spring plate is shown.

In the drawings the side bearing is shown as adapted to be applied to a tapering body bolster. Obviously, however, it may be adapted to a truck bolster or to a bolster of straight form.

The side bearing comprises a suitable frame or housing 1 having its upper face formed either straight or on an incline to fit either a straight or tapering bolster, the latter being indicated diagrammatically at 2. This housing is provided with projecting flanges 3 provided with holes for receiving bolts or rivets for connecting the bearing to the bolster, although obviously it may be integral with the bolster, if desired. The housing is provided with a downwardly projecting outside web 4 and inside web 4ª. These webs, as shown in Fig. 3, are provided with outwardly offset portions 5, which form guideways 5ª for the journals or trunnions 10 of the roller 11, which is free to travel in the housing from end to end thereof along the lower bearing 16. The bottoms of the guideways 5ª are formed by the inwardly projecting flanges 9, which prevent the roller from dropping out of the housing when the truck is removed, but which are sufficiently low down to permit sufficient vertical movement to roller 11 so that the latter remains in constant contact with the lower truck or bearing 16 during all normal clearances between the bolsters. The ends of the housing may be open or may be provided with downwardly projecting end flanges or webs 20, as shown in Fig. 1. Suitable provision is preferably made either in the bottom flanges 9 or in one of the end flanges or webs 20 to permit of the insertion and removal of the roller 11, such, for instance, as leaving the guideway 5ª open at one end.

The roller 11 is of a plain solid construction, either cylindrical or conical, but preferably the latter, as indicated in Fig. 3. The housing itself is also arc-shaped, being struck about the center plate or king pin as a center, so that the roller rolls thereon without other than rolling friction. The inner or smaller end of the roller is plain, while the outer or larger end thereof may be convex, in order that the roller will fit rather snugly between the inside and outside webs 4 and 4ª, whereby it is guided between said webs and is prevented from becoming askew.

The means for causing the roller to travel with all changes in angular relation of the bolsters and also to prevent the roller from becoming displaced from severe end shocks to the car, comprises a suitable spring member which may be arranged in various relations and ways. Fig. 1 shows for this purpose a bearing plate 17 in the housing 1 and bearing against the upper face of the roller for the full length thereof and forming a bearing along which said roller travels. Said plate is constructed of spring steel and its ends are held under or are loosely secured to the extended end portions or flanges 20 of the housing 1, thereby leaving a free space between the plate and the lower surface of the housing in which the plate may flex or bend. Said plate forms both a bearing surface and a spring, its effect being to force the roller constantly downwardly against the lower bearing or bolster 16 during all normal clearances of the bolsters, so that on any change in angular relation between the bolsters the roller is frictionally actuated to roll in one direction or the other in the housing, its upper surface rolling on the plate 17 and its lower surface traveling on the lower bearing 16. At the same time the spring pressure is sufficiently great so that it prevents displacement of the roller under heavy end shocks on the car, which would otherwise tend to throw the roller toward one or the other end of the housing. As a consequence the roller is always in proper position when the bolsters come together, that is, in such position that it is free to roll in either direction with changes in the angular relations of the bolster, so that said roller cannot become locked at one or the other end of the housing and cease to act as an anti-friction element. If the bolsters separate to an abnormal extent the trunnions of the roller come into contact with the lower ledges 9 of the housing and the latter prevent the rollers from dropping out or escaping. In this case the roller will no longer bear against the lower bearing or housing 16. The parts are, however, so designed and proportioned that this does not occur in normal service operation of cars but only in case of accident, such as when the car leaves the truck, or when the trucks are taken from underneath the car in the repair shop.

Fig. 2 shows a modified form of the invention in which the roller is acted upon by means of a plate spring 17ª, whose ends are curved upwardly and toward each other and secured in or to the housing 1ª, being held in place by the bolster 2. The plate 17ª, in this case as well as in that shown in Fig. 1, forms both a spring and a bearing member. In both forms the bearing plate, or the spring plate which also serves as a bearing plate, is of a width corresponding to the length of the roller 11, so that said roller has a bearing on said plate or spring for its entire length, thereby giving a large surface for frictional contact and insuring the non-displacement of the roller under any conditions. If desired, however, the spring plate may be narrower than the length of the roller. Fig. 3 shows a construction in which the spring plate 17ᵇ is comparatively narrow and bears against the roller over only a portion of its surface between the ends thereof.

With all forms of the device during all normal clearances between the bolsters the roller is held in constant contact with the lower bearing or bolster by means of the spring plate with sufficient force to create strong frictional pressure on both the top and bottom surfaces of the roller. Consequently the roller is caused to frictionally roll in the housing with all changes in the angular relations of the bolster. The pressure also is sufficient to create so much friction that the roller cannot be jolted out of its position toward one end or the other of the housing due to end shocks on the car. At the same time, when the roller does move it moves with rolling friction only, since it rolls both at its top and bottom along surfaces; or in other words its peripheral speed is necessarily the same as the speed of movement of the top and bottom bearing surfaces. There can therefore, be no sliding or slipping of either of the bearing surfaces on the roller, and the action is truly a rolling one and entirely free from other than rolling friction, and this is not affected by the fact that the springs used are very strong. All that is necessary is that the pressure of the spring be at least great enough to cause sufficient friction between the roller and the two adjoining bearing plates, so as to keep the roller in absolute control, even under heavy end shocks.

The bearing described is of comparatively simple construction, comprising practically only three or at most four parts, to-wit, the housing, the roller and the spring. The housing is entirely open on its bottom so that it cannot clog with dirt or the like to interfere with its free operation. Obviously the bearing operates exactly the same if turned upside down and secured to the bottom bolster with the roller bearing against an upper bearing or bolster.

Various changes may be made in the form and arrangement of the parts without departing from the spirit of the invention.

What I claim is:

1. A side bearing for cars comprising a housing for a car bolster, a roller free to roll in said housing, and a spring member in said housing and having a bearing surface along which said roller rolls, said spring member acting to press the roller constantly toward the coöperating bearing or bolster.

2. A side bearing for cars comprising a housing for a car bolster, a roller free to roll in said housing, and a plate member formed of spring metal and having its end portions bearing against said housing, the surface of said plate member forming a bearing along which said roller rolls, said plate member acting to force the roller constantly toward the coöperating bearing or bolster.

In testimony whereof I have hereunto set my hand.

ARNOLD STUCKI.

Witnesses:
F. W. WINTER,
MARY E. CAHOON.